United States Patent
Banerjee

[11] Patent Number: 6,064,209
[45] Date of Patent: May 16, 2000

[54] APPARATUS AND PROCESS FOR CLEARANCE OF UNEXPLODED ORDINANCE

[75] Inventor: Vikram K. Banerjee, Calgary, Canada

[73] Assignee: Xtech Explosive Decontamination, Inc., Calgary, Canada

[21] Appl. No.: 09/080,840

[22] Filed: May 18, 1998

[51] Int. Cl.$^7$ ............................................. G01V 3/11
[52] U.S. Cl. ..................... 324/329; 324/345; 89/1.13
[58] Field of Search ................................. 324/329, 345, 324/239, 334; 114/313; 89/1.13

[56] References Cited

U.S. PATENT DOCUMENTS

| | | | |
|---|---|---|---|
| 3,090,306 | 5/1963 | Reuther | 102/22 |
| 3,939,753 | 2/1976 | Rosborough et al. | 89/1 M |
| 3,946,696 | 3/1976 | Lubnow | 114/221 |
| 4,220,108 | 9/1980 | Burt | 114/244 |
| 4,562,789 | 1/1986 | Bornhofft et al. | 114/312 |
| 4,629,990 | 12/1986 | Zandee | 324/330 |
| 4,840,105 | 6/1989 | Ladan et al. | 89/1.13 |
| 5,001,485 | 3/1991 | Jones | 342/13 |
| 5,323,726 | 6/1994 | Olsson | 114/221 |
| 5,361,675 | 11/1994 | Spektor et al. | 89/1.13 |
| 5,458,063 | 10/1995 | Laine et al. | 102/402 |
| 5,525,907 | 6/1996 | Frazier | 324/334 |
| 5,552,705 | 9/1996 | Keller | 324/239 |
| 5,576,624 | 11/1996 | Candy | 324/329 |
| 5,592,170 | 1/1997 | Price et al. | 342/22 |
| 5,642,050 | 6/1997 | Shoemaker | 324/329 |
| 5,748,138 | 5/1998 | Telle et al. | 342/45 |
| 5,767,679 | 6/1998 | Schroder | 324/337 |
| 5,770,944 | 6/1998 | Ebinger et al. | 324/329 |
| 5,786,696 | 7/1998 | Weaver et al. | 324/329 |
| 5,825,298 | 10/1998 | Walter | 340/825.54 |

*Primary Examiner*—Christine K. Oda
*Assistant Examiner*—Victor J. Taylor
*Attorney, Agent, or Firm*—Sheridan Ross P.C.

[57] ABSTRACT

A two-step process for clearing unexploded ordnance ("UXO") from the ground. First a high power electromagnetic transmitter sweeps the ground area to be decommissioned. Secondly a lower-power time-domain electromagnetic transmitter or metal detector sweeps the same area to locate UXO. The high power transmitter employs a waveform of having the same frequency and pulse duration as that of the metal detector but does so with at least twice the power, Firstly, when the higher power waveform is applied to the ground, UXO which does not trigger and detonate or "function" is proved as non-functioning at lower detection power. Subsequently, the ground area can then be safely scanned by human personnel with impunity, applying the more accurate, lower power metal detector. The detected locations of unexploded ordnance are recorded for subsequent manual removal.

20 Claims, 5 Drawing Sheets

APPARATUS AND PROCESS FOR CLEARANCE OF UNEXPLODED ORDINANCE

FIELD OF THE INVENTION

The present invention is related to apparatus and method for clearing unexploded ordnance having triggering mechanisms capable of being functioned by magnetic fields or induced electric currents.

BACKGROUND OF THE INVENTION

It is known that in order to decommission land used for military purposes and return it to a safe, habitable environment, all unexploded ordnance (UXO) remaining in the ground must be removed safely and efficiently. This needs to be accomplished with painstaking and hazardous hand work.

Current technology provides both passive and active systems for the detection of subterranean unexploded ordnance. The passive systems measure variations in the earth's magnetic field and are the safest to human personnel as they do not result in the triggering and detonation or "functioning" of unexploded ordnance. They do not, however, provide an accurate, sensitive scan as they are subject to environmental interference, such as anomalous magnetic soils, and are unable to detect non-ferrous metals.

Active "time domain" metal detectors are more accurate, detect non-ferrous metals, and probe deeper than do the passive systems. An electromagnetic transmitter produces a pulsed primary magnetic field in the earth, which induces eddy currents in nearby metallic UXO. The eddy current decay produces a secondary magnetic field measured by the receiver coil. The measurement is taken at a relatively long time after the start of the decay to allow the current induced in the ground to fully dissipate. In this way, only the current produced by the secondary magnetic field is detected by the receiver coil. The responses from the receiver coil are recorded and displayed by an integrated data logger.

Time domain metal detectors are most efficient when operated by human personnel as their location on the ground must be precisely controlled in order to relocate UXO once the data collected by the data logger is evaluated.

The electrical current and resulting magnetic current produced by the active metal detecting devices also induces an electrical current in nearby metallic UXO. This current may be sufficient to trigger fuses of unexploded ordnance that employ electronic fuses, with catastrophic results for the person conducting the search.

Other inventors have attempted to clear UXO, and more specifically mines, by triggering electronic fuses with electromagnetic signals. Because the nature of a signal that will trigger a fuse is unknown, a variety of signals are tried. For example, U.S. Pat. No. 5,361,675 to Specktor describes a land-based invention wherein a magnetic mine detonation apparatus is mounted on a vehicle and utilizes varying waveform configurations for the purposes of detonating all magnetic mines within the scan area.

U.S. Pat. No. 4,220,108 to Burt describes a multi-sweep method in an underwater environment. While minesweeping ships are constructed with a very low magnetic signature, modern magnetic detection systems have advanced to the point where even these small magnetic signatures can be detected. Burt teaches use of a permanent magnet which produces a large magnetic signal, greater than the magnetic signature of a following minesweeping ship. This permanent magnet is towed ahead of the following minesweeper with the objective of actuating substantially all magnetically triggered mines in its path. As is virtually impossible to duplicate the exact magnetic signature characteristics of a minesweeper, the field strength of the first magnetic signal is varied by allowing the magnet to move zigzag back and forth transverse to the course and clear a channel. The minesweeper follows relatively safely in the de-mined channel. Additional minesweeper or additional passes may be used to actuate mines in an ever-widening channel.

To function UXO, two aspects must be satisfied: one, a signal must be produced which is capable of triggering functioning of the UXO; and second, the signal must be generated in the location of the UXO. Note that each UXO is unique in terms of its design, historical trauma and environmental effects, and as such, signal characteristics which are capable of triggering functioning of the UXO are unknown.

The prior art minesweepers address a similar problem with magnetically-activated mines. As part of the solution, they vary the waveform as they traverse a mined area. One of the risks with a moving system and a variable waveform is that there is no assurance that waveform being applied at any instant is the one which would trigger the fuse in mine being scanned.

The prior art minesweepers further seek to actuate or function as many of the mines as possible and, for safety, space the mine-triggering device some distance from the personnelcarrying vehicle.

The prior art operate on a macro scale for clearing a path through a field for passage of additional minesweeping or other military vehicles and are not concerned with accurate, detailed detection of UXO. The problem remains that for decommissioning of land subsequently intended for human use, there is a demonstrated need to be able to safely remove all UXO, utilizing the precision which is only possible using human-operated detecting equipment or extremely expensive, remote vehicle-navigation systems such as inertial guidance and sub-cm differential global positioning systems.

SUMMARY OF THE INVENTION

The present invention employs both armoured vehicle-conveyed and human-towed apparatus in a two-step process to provide a safe, efficient means of removing all unexploded ordnance and returning land to a habitable state.

In the preferred embodiment, a patch of ground is first sweep using a high-powered electromagnetic proving transmitter having a known waveform. Any UXO sensitive to that waveform will either detonate or function at that power or it is proven that it will not function under the influence of that waveform. The patch of ground is then swept again using a lower-powered electromagnetic detection transmitter emitting the same waveform source only at a lower power. The detection transmitter will not function any UXO in the proven patch of ground. Accordingly, the detection transmitter can be safely conveyed and accurately operated using human-personnel without fear of injury.

Accordingly, in one broad aspect of the invention, apparatus is provided comprising:
  a metal detector having a first electromagnetic transmitter and a receiver, said detector being capable of detecting ferrous and non-ferrous metals, said first electromagnetic transmitter producing a first electromagnetic waveform; and
  a second electromagnetic transmitter device which produces a second waveform having the same characteristics as the first waveform excepting that the second waveform is produced at a higher power so that unexploded ordnance which do not detonate at the second waveform are proved non-functioning when exposed to the first waveform.

Preferably, the first and second waveforms comprise a series of electrical pulses wherein the pulses of the first waveform and second waveforms have the same duration and the same frequency and the amplitude of the pulse of the first waveform is greater than the amplitude of the pulse of the second waveform.

The above apparatus is amenable to application to a patch of ground in a unique two-step sweeping process comprising:

firstly transmitting a proving electromagnetic waveform into the patch at a power greater than that required to induce a measurable electromagnetic field in unexploded ordnance wherein any unexploded ordnance which is sensitive to that waveform will either detonate or not detonate; and secondly transmitting a detection electromagnetic waveform into the patch wherein the detection waveform has the same characteristics as the proving waveform except that the detection waveform has a power which is lower than that of the proving waveform but is sufficient to induce a measurable electromagnetic field in the unexploded ordnance; and receiving and measuring the electromagnetic field induced in the unexploded ordnance by the detection waveform for identifying the presence of unexploded ordnance.

DETAILED DESCRIPTION OF THE PREFERRED EMBODIMENT

Generally

Figure 1:
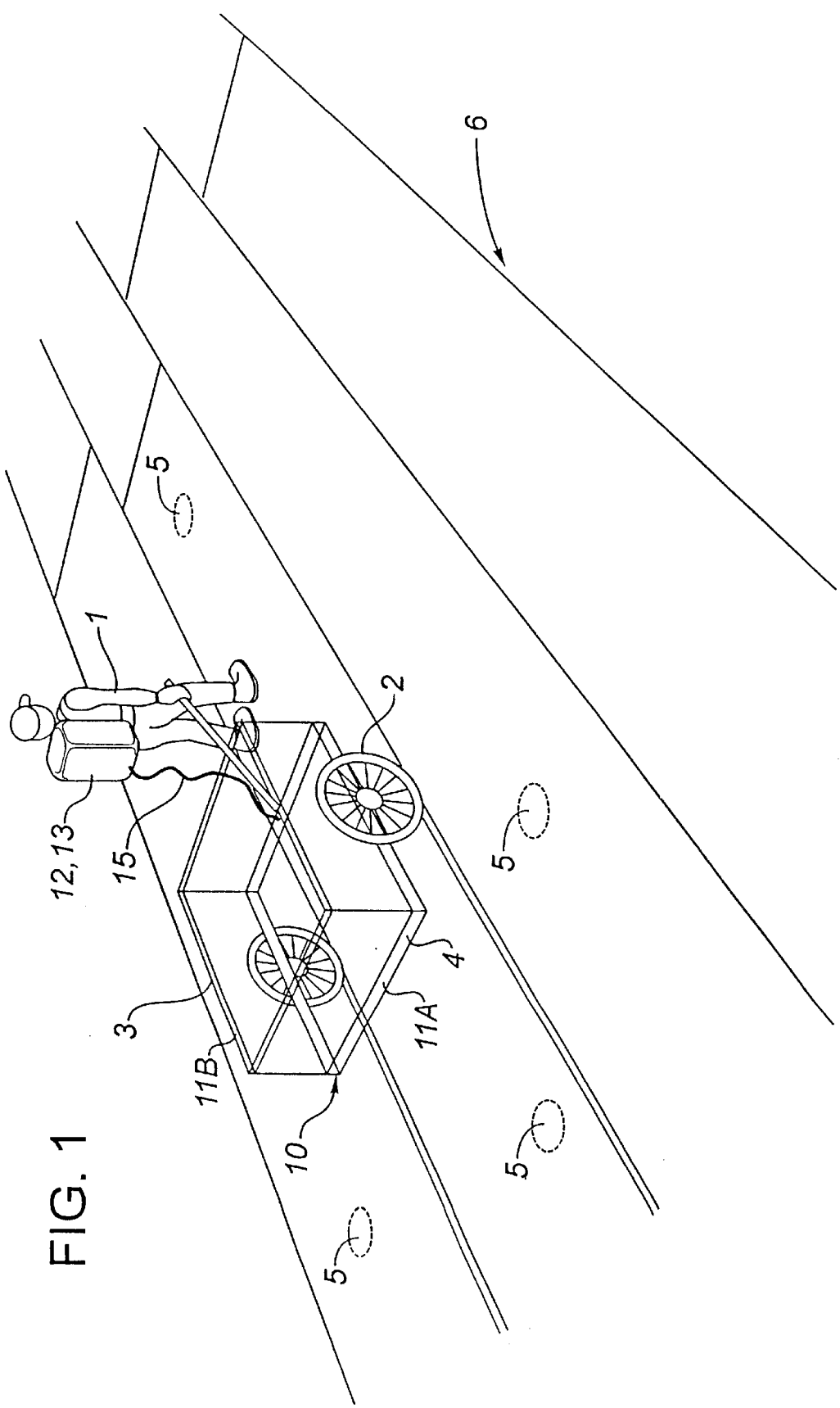
FIG. 1 is a perspective view of the personnel-conveyed metal detector, operated in accordance with one embodiment of the invention, more specifically being operated after the passage of a higher-powered EM transmitter. The metal detector is shown traversing one of a series of rectilinear paths.

Having reference to FIG. 1, a human operator 1 is shown towing trailer 2 carrying an active electromagnetic metal detector 3. The detector 3 employs a first electromagnetic (EM) detection transmitter 4 which is used for detecting unexploded ordnance (UXO) 5 buried in the ground. The UXO 5 is subsequently neutralized for decommissioning a defined area 6 of the ground (typically by manual excavation).

At least some of the UXO 5 are of the type employing electronic fuses.

Figure 2:
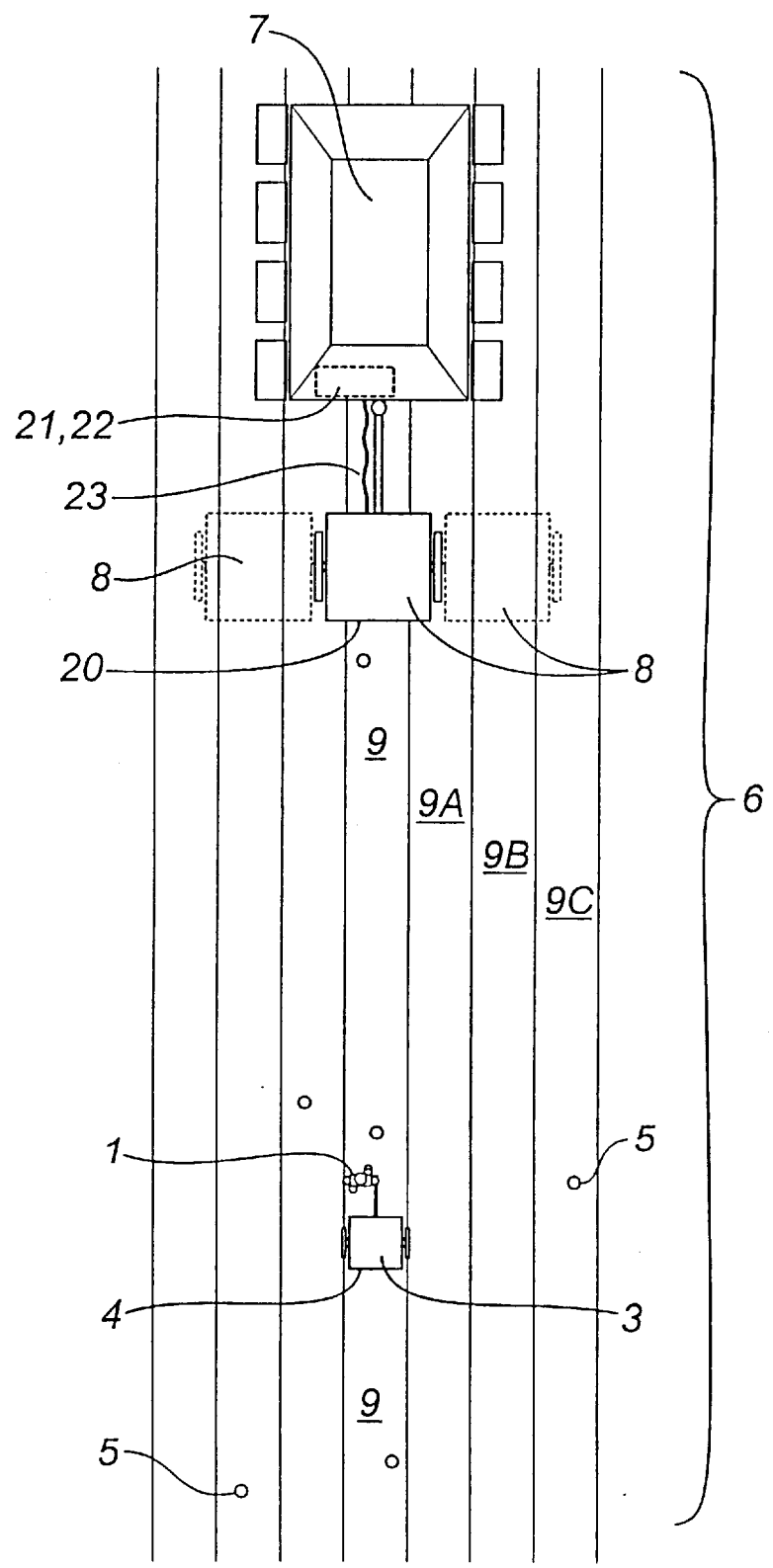
FIG. 2 is a top view of the human personnel-conveyed time domain metal detector following in the path proved by the higher-powered EM transmitter.

Having reference to FIG. 2, a leading vehicle 7 employs a second EM proving transmitter 8. The operator 1 and metal detector 3 follow the leading vehicle 7 at a safe distance (typically 250 m for most ordnance, excluding larger aircraft bombs and missiles). Alternatively, the operator and metal detector can follow much later in time. The leading vehicle 7 and proving transmitter 8 render a path 9 safe for the following operator 1 and detection transmitter 4.

The Detection Transmitter

More particularly and referring again to FIG. 1, the metal detector 3 comprises a main coil 10 incorporating the detection transmitter 4 and a first receiver coil 11a. The detector 3 further comprises a focussing or second receiver coil 11b. The detection transmitter 4 is coincident with the first receiver coil 11a. The detection transmitter 4 and receiver coils 11a, 11b are spaced from the ground. A controller 12 and first signal generator 13 produce a pulsed electric signal 14 and is applied to the detection transmitter 4 through connector 15. During the pulse of signal 14, current is produced in the detection transmitter 4 and creates a magnetic field which extends into the ground. The magnetic field produced is of sufficient strength to induce eddy currents in metal, including metal UXO 5. The end of the signal's pulse represents cessation of current to the detection transmitter 4. The decay of the eddy current sets up a secondary magnetic field which is ultimately detected by receivers 11a, 11b.

The second receiver 11b is spaced above the main coil 10. Both first and second receiver coils 11a, 11b receive the secondary magnetic field. The spacing between the first and second receiver coils 11a, 11b enable determination of the depth of detected UXO 5.

An example of such a metal detector is model EM61 time domain metal detector available from Geonics Ltd., Mississauga, Ontario.

Figure 3A:
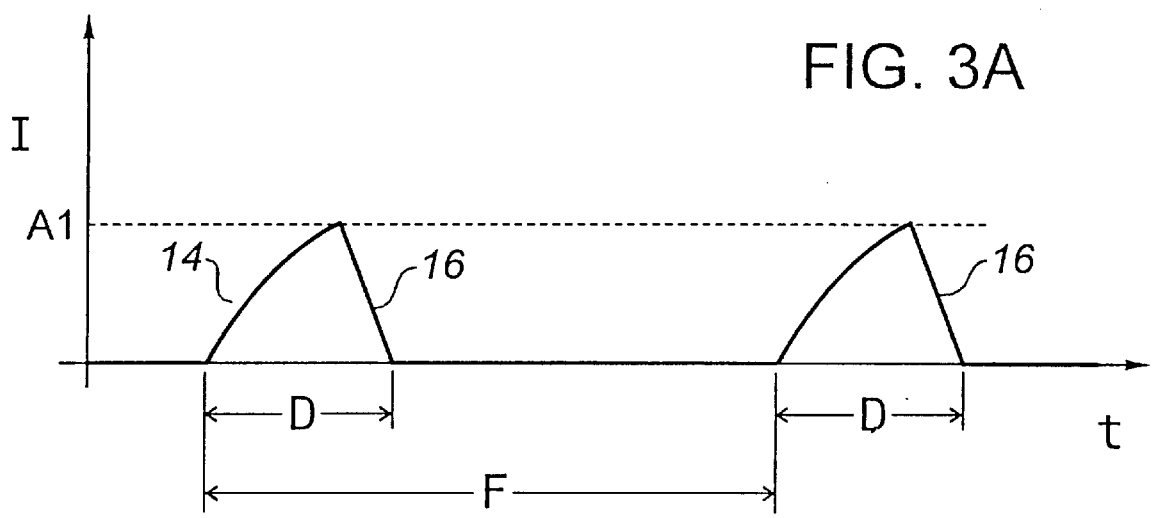
FIGS. 3a and 3b illustrate the similarity in the characteristics of the nature of the waveforms produced by the detection transmitter (FIG. 3a) and the second EM transmitter (FIG. 3b).

Having reference to FIG. 3a, the first signal generator 13 produces a signal 14 comprising a waveform having a series of pulses 16. The pulses 16 are part of the unique characteristics of the signal's waveform including: pulse amperage or amplitude A1, pulse duration D, and pulse frequency F. Power of the signal 14 is related to the square of the pulse amplitude A1.

For the known EM61 detector, a pulse amplitude A1 of 8 amperes is produced with a pulse duration D of 3.33 ms and a frequency F of 75 Hz.

The frame of trailer 2 is constructed of a non-conducting material so as to isolate the detection transmitter 8 from other structure.

The Proving Transmitter

Figure 3B:
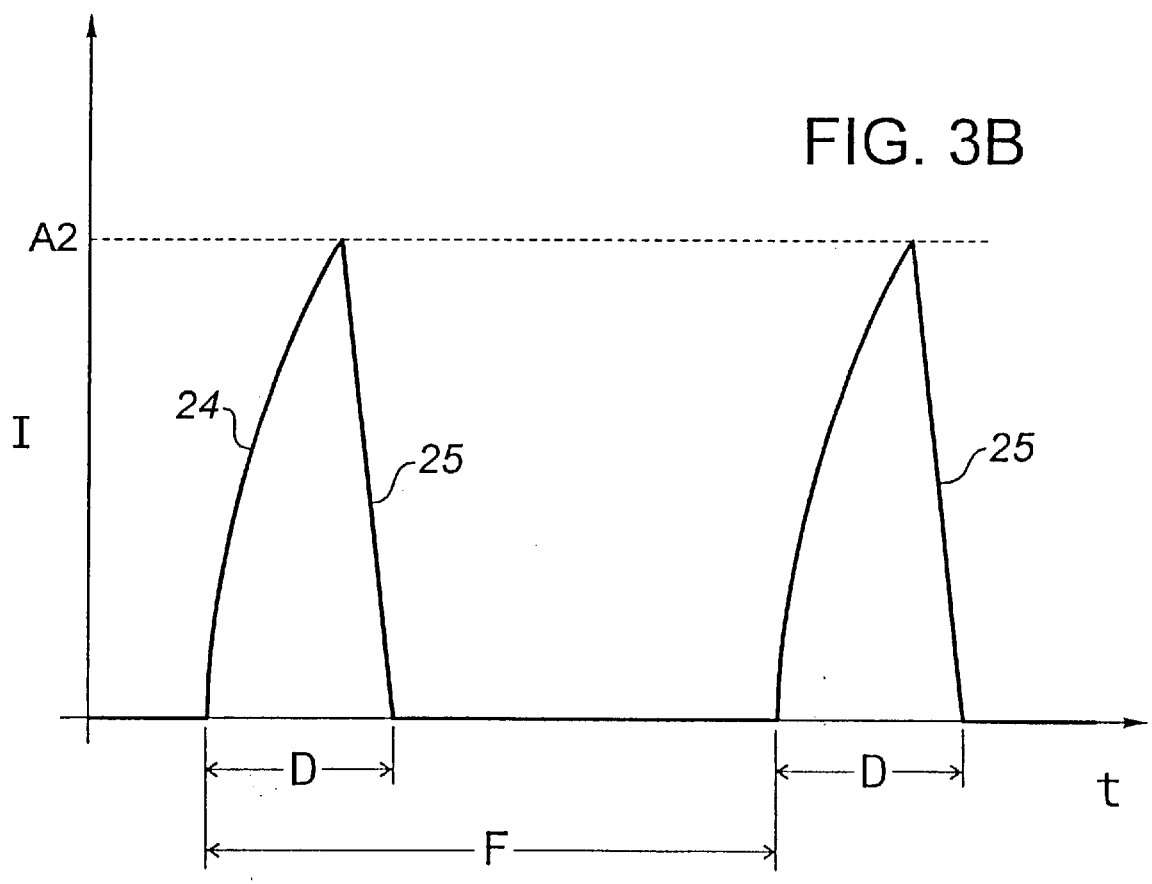

The second EM proving transmitter 8 comprises a proving transmitter coil 20 connected to a controller 21 and a second signal generator 22 with connector 23. As shown in FIG. 3b, the second signal generator 22 produces a second signal 24 and waveform having similar characteristics to the first signal generator's signal 14 except in one respect; the second signal 24 has an amperage or amplitude A2 which is higher than the amplitude A1. Signal power of about 2 times or greater (amperage A2 being 1.414 times greater that A1) is sufficient.

Typically an EM61 detection transmitter 4 produces a peak signal amperage A1 of 8 amps. A large factor of safety is achieved through use of A2 of 40 amps. The amperage increase is 5 times (40/8) or a power increase of 25 times.

The second signal 24 has pulses 25 having the same duration D and frequency F as does the first signal 14.

First signal 14 is capable of functioning a small, but clearly hazardous, number of UXO 5, As previously stated, whether UXO 5 will function is dependant upon the state of its fuse. To avoid the hazard and expense of functioning all UXO, it is desirable to function, or prove non-functioning, only UXO which are sensitive to signal 14. As demonstrated by the prior art, individual UXO 5 will function under different electromagnetic fields (i.e. different pulse duration and different frequency).

Accordingly, UXO 5 is first subjected to a higher-power signal 24 having the same pulse duration and frequency characteristics as the first signal 14. Signal 24 is applied to the ground and buried UXO. Eddy currents are induced in the UXO 5. The specific eddy current induced may or may not function the UXO 5. If the UXO 5 does not function, that UXO is proved that it will also not function when subjected to the lower-powered signal 14.

To ensure safety of personnel operating the proving transmitter 8, it is mounted on a trailer 30 having wheels 31 which is towed behind the leading vehicle 7 which is armoured. Such vehicles include an armored personnel carrier, a main battle tank chassis, or a truck with added armour. The leading vehicle could be a remote controlled vehicle.

In Operation

Figure 4:
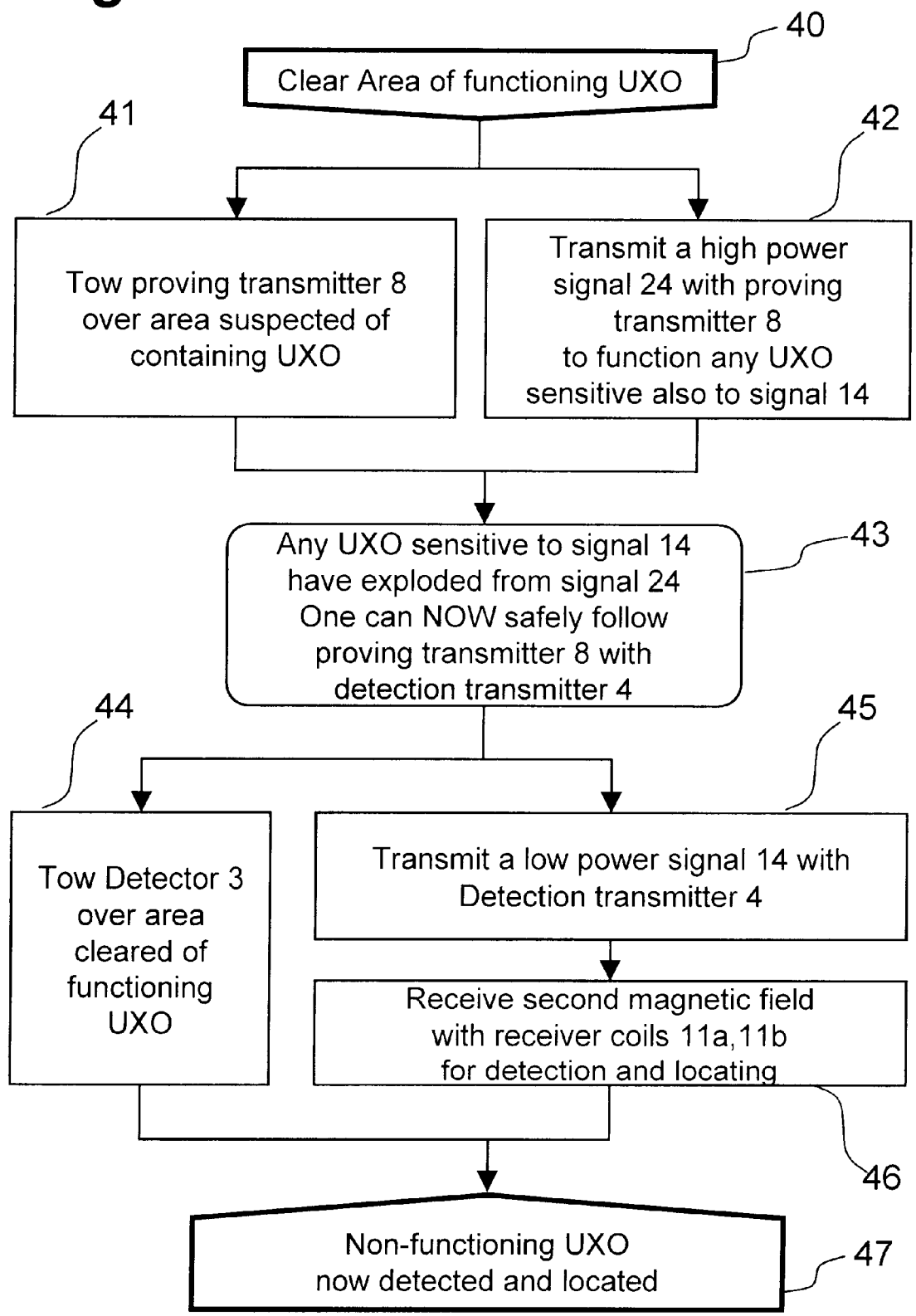
FIG. 4 is a flow chart illustrating sequential UXO functioning and UXO detection steps.

Having reference to FIG. 4, and beginning at block 40, to clear an area 8 of UXO, the proving transmitter 8 is towed over the area 6 to be decommissioned (block 41). An efficient ground track pattern is utilized. One such pattern, amenable to uncomplicated terran is to employ a sequence of rectilinear paths (9,9a,9b,9c . . . ).

The trailer-mounted proving transmitter 8 preferably covers a larger area than does the human-conveyed detection transmitter 4. As the proving transmitter 8 need only prove non-functioning of UXO and not pin-point it, its accuracy need not be as great as that required of the detection transmitter 4.

UXO 5 in area 6 are either functioned by the second signal 24 (block 42) or are proven to be non-functioning at the specific characteristics of signal 24 and more particularly at the specific characteristics of first signal 14.

As a result, (block 43) the metal detector 3 can be towed (block 44) by human operator 1, without fear of inducing functioning, over the same sequence of rectilinear paths (9,9a . . . ), proved safe by the proving transmitter 8.

The positioning of the metal detector 3 is precisely controlled by the human operator 1. The secondary magnetic field induced in the metal UXO by signal 14 (block 45), and received by the first and second receivers 11a, 11b (block 46) is stored in a data collecting device integrated with the controller 12 and first signal generator 13, carried by the human operator 1. The wheels of the trailer are fitted with an odometer and outputs traversed distance data which is collected for measured intervals. The measured length of the path (9,9a . . . ) traversed, typically 50 meters, is compared against the odometer distance. The locations of UXO are normalized (measured/odometer) and more accurate locations of the detected UXO 5 are calculated. The location of UXO 5 is recorded (block 47) and can be re-located later for neutralization.

In another embodiment of the invention, a plurality of detection transmitters are towed side by side to increase the path width swept with each pass. The detection transmitters are towed closely behind an all-terrain vehicle.

Figure 5:
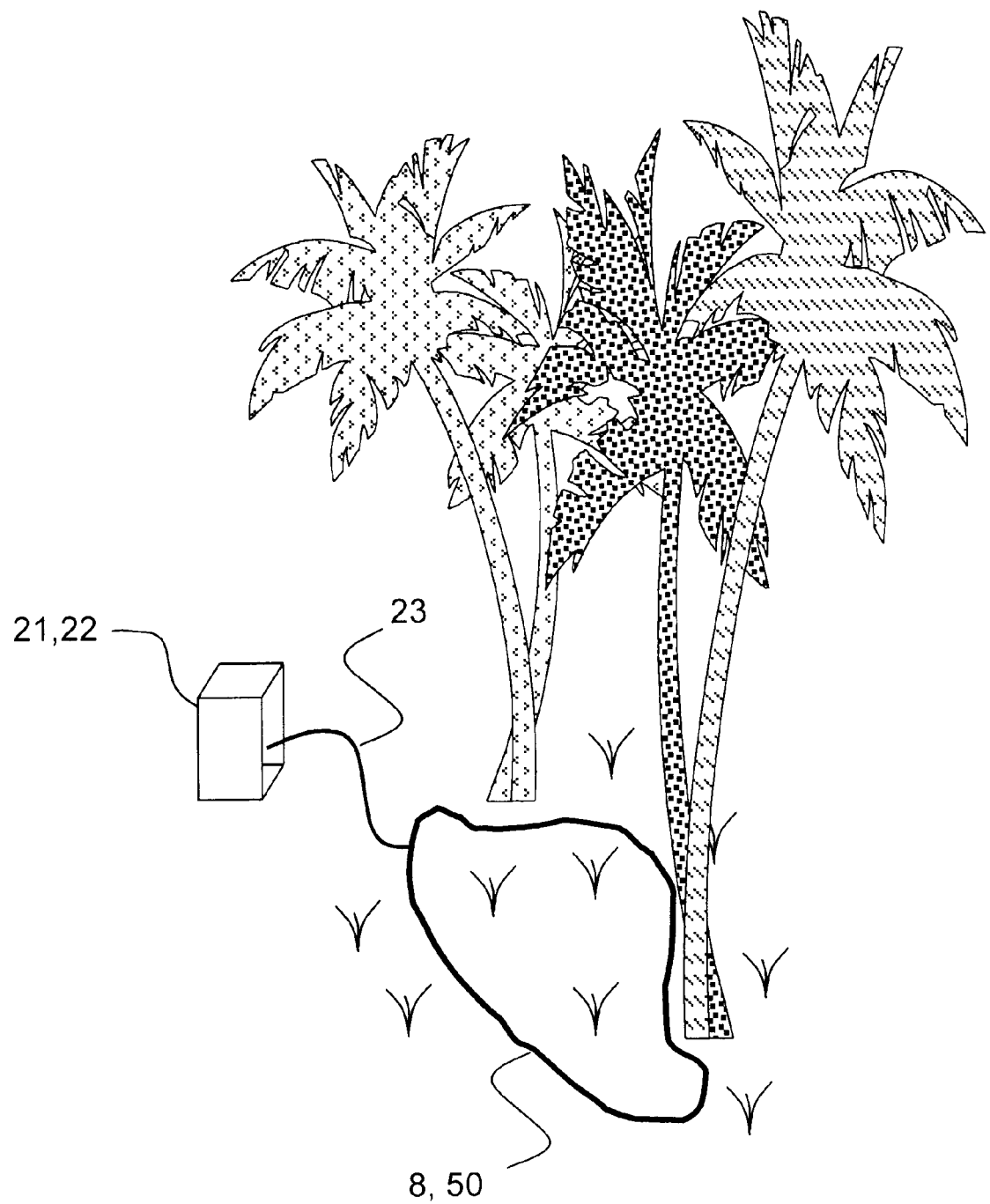
FIG. 5 is a perspective view illustrating positioning of the proving transmitter as a loop when obstacles prevent access by a vehicle.

In yet another embodiment of the invention, as shown in FIG. 5, where terrain is too rough to be traversed by vehicle or contains too many obstacles, the higher-power proving transmitter 8 is formed using electrically conductive cables laid out directly on the irregular ground surface to form loops 50.

In yet another embodiment of the invention, as illustrated as phantom line in FIG. 2, a plurality of trailer-mounted proving transmitters are towed side by side to increase the path width swept with each pass. Further, the signal pulses of each of a plurality of proving transmitters may be synchronized.

The embodiments of the invention in which an exclusive property or privilege is being claims is detailed as follows:

1. A method of sweeping a patch of ground for unexploded ordnance, said method comprising the steps of:
   transmitting a proving electromagnetic waveform into the patch at a power greater than that required to induce a measurable electromagnetic field in unexploded ordnance wherein any unexploded ordnance which is sensitive to that waveform will either detonate or not detonate;
   transmitting a detection electromagnetic waveform into the patch wherein the detection waveform has the same characteristics as the proving waveform except that the detection waveform has a power which is lower than that of the proving waveform but is sufficient to induce a measurable electromagnetic field in the unexploded ordnance; and
   measuring the electromagnetic field induced in the unexploded ordnance by the detection waveform for identifying the presence of unexploded ordnance.

2. The method as recited in claim 1 wherein:
   the detection waveform comprises a series of electrical pulses having a duration, a frequency, and a detection amplitude;
   the proving waveform comprises a series of electrical pulses having the same duration and the same frequency as the detection waveform; and
   the proving waveform having a proving amplitude which is greater than the detection waveform's amplitude.

3. A method of sweeping a patch of ground for unexploded ordnance, said method comprising the steps of:
   providing a detection electromagnetic transmitter and a detection electromagnetic receiver, the detection transmitter producing a detection waveform having sufficient power to induce production of an electromagnetic field by the unexploded ordnance so as to enable detection by the detection receiver;
   providing a proving electromagnetic transmitter which produces a proving waveform having the same characteristics as the detection waveform except that the proving waveform power is higher than the detection waveform power;
   transmitting the proving waveform into the patch using the proving transmitter to prove non-functioning of the unexploded ordnance; and
   transmitting the detection waveform into the proved patch using the detection waveform wherein unexploded ordnance is detected by the detection receiver without functioning the unexploded ordnance.

4. The method as recited in claim 3 wherein:
   the detection waveform comprises a series of electrical pulses having a duration, a frequency, and a detection amplitude;
   the proving waveform comprises a series of electrical pulses having the same duration and the same frequency as the detection waveform; and
   the proving waveform having a proving amplitude which is greater than the detection waveform's amplitude.

5. The method as described in claim 4 wherein the proving electromagnetic transmitter is mounted on a trailer and is towed by an armored vehicle.

6. The method as described in claim 5 wherein the detection electromagnetic transmitter is a time domain metal detector.

7. The method as described in claim 4 wherein the patch is subjected to an electromagnetic field by towing the detection transmitter sequentially over an array of rectilinear paths rendered safe by the proving transmitters.

8. The method as recited in claim 4 wherein the location of unexploded ordnance detected by the metal detector is marked for manual neutralization.

9. The method as recited in claim 4 wherein the area is subjected to the proving electromagnetic transmitter by deploying electrically conductive cables to produce a non-regular shaped electromagnetic transmitter on the surface of terrain too difficult to traverse by vehicle.

10. Apparatus for detonation and detection of unexploded ordnance comprising:

a metal detector having a first electromagnetic transmitter and a receiver, said detector being capable of detecting ferrous and non-ferrous metals, said first electromagnetic transmitter producing a first electromagnetic waveform; and a second electromagnetic transmitter device which produces a second waveform having the same characteristics as the first waveform excepting that the waveform is produced at a higher power so that unexploded ordnance which do not detonate when exposed to the second waveform are proved non-functioning when exposed to the first waveform wherein the metal detector can be safely operated without fear of injury.

11. Apparatus as recited in claim 10 wherein:

the first and second waveforms comprise a series of electrical pulses;

the pulses of the first waveform and second waveforms have the same duration and the same frequency; and the amplitude of the pulse of the first waveform is greater than the amplitude of the pulse of the second waveform.

12. Apparatus as recited in claim 11 wherein the metal detector is mounted on a trailer and is towed by human personnel.

13. Apparatus as recited in claim 12 wherein the high power electromagnetic transmitter is towed by an armored vehicle.

14. Apparatus as recited in claim 13 wherein the metal detector is electrically isolated from the wheels and axle of the trailer.

15. A system for sweeping a patch of ground for unexploded ordnance, comprising:

proving means for transmitting the proving waveform into the patch using the proving transmitter to prove non-functioning of the unexploded ordnance, wherein the proving waveform has substantially the same characteristics as a detection waveform except that the proving waveform power is higher than the detection waveform power; and detecting means for transmitting the detection waveform into the proved patch wherein unexploded ordnance is detected by the detection receiver without functioning the unexploded ordnance.

16. The system as recited in claim 15, wherein:

the detection waveform comprises a series of electrical pulses having a duration, a frequency, and a detection amplitude;

the proving waveform comprises a series of electrical pulses having the same duration and the same frequency as the detection waveform; and the proving waveform has a proving amplitude which is greater than the detection waveform's amplitude.

17. The system as described in claim 15, wherein the proving means is mounted on a trailer and is towed by an armored vehicle.

18. The system as described in claim 15, wherein the proving and detection means are each a time domain metal detector.

19. The system as described in claim 15, wherein the patch is subjected to an electromagnetic field by towing the detecting means sequentially over an array of rectilinear paths rendered safe by the proving means.

20. The system as recited in claim 15, wherein the proving means includes electrically conductive cables deployed over the patch and configured to produce a non-regular shaped electromagnetic transmitter.

* * * * *